United States Patent [19]

Peterson

[11] 3,780,989
[45] Dec. 25, 1973

[54] TOWING WINCH
[76] Inventor: Earl A. Peterson, 4111 Chestnut Ave., Long Beach, Calif. 90807
[22] Filed: Aug. 12, 1971
[21] Appl. No.: 171,278

[52] U.S. Cl............. 254/173 R, 192/88 A, 340/259
[51] Int. Cl.............................................. B66d 1/48
[58] Field of Search.......................... 254/172, 173; 192/88 A, 56 P, 85 A; 64/30 C; 214/13; 340/259, 261, 271; 318/488

[56] References Cited
UNITED STATES PATENTS

| 3,500,764 | 3/1970 | Warman | 254/173 R |
| 3,052,878 | 9/1962 | Berry | 340/259 X |
| 3,264,629 | 8/1966 | Le Bus | 340/259 |
| 3,530,965 | 9/1970 | Wilson | 192/88 A X |
| 3,251,332 | 5/1966 | Vassar | 254/173 R |

Primary Examiner—Richard E. Aegerter
Assistant Examiner—H. S. Lane
Attorney—Spensley, Horn & Lubitz

[57] ABSTRACT

A towing winch incorporating apparatus for maintaining controlled tension in a towing cable and relative distance between the towing and towed object. A towing vessel is supplied with a winch incorporating a clutch capable of maintaining controlled tension in a towing cable. The clutch is controlled by a regulator system which is responsive to changes in the tension in the towing cable altering the output torque of the clutch to maintain a predetermined level of tension in the towing cable. Apparatus responsive to the linear displacement of the towing cable maintains a predetermined linear distance between the towing vessel and towed object.

11 Claims, 5 Drawing Figures

PATENTED DEC 25 1973

EARL A. PETERSON
INVENTOR

BY

SPENSLEY, HORN & LUBITZ
ATTORNEYS

EARL A. PETERSON
INVENTOR

BY
SPENSLEY, HORN & LUBITZ
ATTORNEYS

EARL A. PETERSON
INVENTOR

BY
SPENSLEY, HORN & LUBITZ
ATTORNEYS

TOWING WINCH

BACKGROUND OF THE INVENTION

1. Field of the Invention

The present invention generally relates to the field of hoisting or towing apparatus and, more particularly, to those towing apparatus capable of maintaining a controlled tension in the towing line and maintaining a predetermined distance between the respective objects.

2. Prior Art

The increase in marine traffic has created severe problems, some arising out of the congestion of port facilities. In addition, the economics dictated by the movement of marine vessels has created a need for improved towing equipment. Additionally, the need for improved marine towing operations in open waters has lead to similar needs for improved towing apparatus. The devices disclosed by the prior art have left various problems unresolved. Several problems which the present invention seeks to solve are the difficulties caused by entering or leaving maneuverable waters, the loss in horsepower due to long tow lines, the expense arising out of damage to tow lines due to surge and shock loading and the danger of collision between the towing vessel and towed object during a towing operation.

One of the devices disclosed by the prior art seeks to provide an apparatus for controlling a towing winch as well as maintaining a predetermined length of cable between the towing vessel and the towed object. The device sought to solve the problems by providing control whereby the power source for the winch can be reversed whereby the paying out or hauling in of the towing cable is provided by the operational rotation of the winch power source. The length of cable between the towing vessel and the towed object was controlled by the movement of a traveling nut between opposed switches. Substantial problems are left unresolved by the devices disclosed by the prior art. The mechanical nature of the device precludes sufficiently low reaction time to changes in tension in the towing cable. The requirement that the power source be capable of operating in opposite rotational direction imposes severe restrictions on the type of equipment which can be utilized as well as the ability and reliability of the device to perform the stated objects.

Other devices disclosed by the prior art disclosed means for controlling tension in a cable or providing for the horizontal transport of a cable and supported load, but all of the devices so disclosed leave substantial problems unresolved. The present invention towing winch provides apparatus for maintaining controlled tension in a towing cable as well as maintaining a predetermined distance between a towing vessel and a towed object, the present invention apparatus utilizing elements which substantially improve performance over those devices disclosed by the prior art. The present invention towing winch utilizes a continuously slipping clutch capable of maintaining a predetermined differential speed between the driving and driven elements of the clutch while being capable of fully dissipating all heat horsepower generated during the operation of the clutch. Control over the clutch is based upon the tension in the cable, the output torque of the clutch being adjusted in response to changes in the tension in the cable. The present invention towing winch utilizes means for measuring the linear displacement of the towing cable to provide direct control over the output torque of the continuously slipping clutch to alter the tension in the cable and maintain a proper interval between the towing vessel and towed object.

SUMMARY OF THE INVENTION

The present invention comprises an improved towing winch for controlling the tension in a towing cable and maintaining a predetermined interval between the towing vessel and towed object. The present invention towing winch is supported upon a floating support structure typically being a towing vessel. The towing cable is disposed between the towed object such as a barge and the present invention towing winch, the cable being wound about a drum of the towing winch. A power source provides unidirectional rotational power to a clutch adapted to operate in a continuously slipping mode whereby a predetermined differential speed can be maintained between the driving and driven elements of the clutch. The driving elements of the clutch rotate in the in-haul direction transmitting a given level of torque to the driven member of the clutch.

A load cell or other measuring apparatus responsive to the tension in the towing cable is used to control and change the output torque of the continuously slipping clutch to maintain the tension in the cable at a predetermined level. By this means, the drum can be caused to pay out or reel in towing cable to maintain constant tension in the towing cable irrespective of the operating conditions.

To maintain a predetermined interval between the towing vessel and the towed barge, measuring apparatus adapted to be responsive to the linear movement of the towing cable is used. Since the barge is to be maintained at a predetermined interval from the towing vessel, establishment of the interval will thereby permit correction in the output torque of the continuously slipping clutch to correct for positive or negative displacement of the barge with respect to the towing vessel. The output of the linear measuring apparatus will raise or lower the output torque of the clutch thereby increasing or decreasing the tension in the cable until the correction has been made. After making the correction in linear displacement, the tension in the towing cable will be returned to the predetermined level thereby returning to the predetermined quiescent conditions of cable tension and linear interval.

It is therefore an object of the present invention to provide an improved towing winch.

It is another object of the present invention to provide an improved towing winch capable of maintaining a predetermined tension in a towing cable.

It is still another object of the present invention to provide an improved towing winch for maintaining a predetermined cable tension and linear interval between the towing vessel and towed object.

It is yet another object of the present invention to provide an improved towing winch for maintaining a predetermined distance between the towing vessel and towed object by measurement of the linear displacement of the towing cable.

It is still yet another object of the present invention to provide an improved towing winch incorporating a clutch adapted to maintain a predetermined differential speed between the driving and driven elements of the clutch to control the tension in the towing cable and the interval between the towing vessel and towed object.

The novel features which are believed to be characteristic of the invention, both as to its organization and method of operation, together with further objectives and advantages thereof will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

DESCRIPTION OF THE PRESENTLY PREFERRED EMBODIMENT

Figure 1:
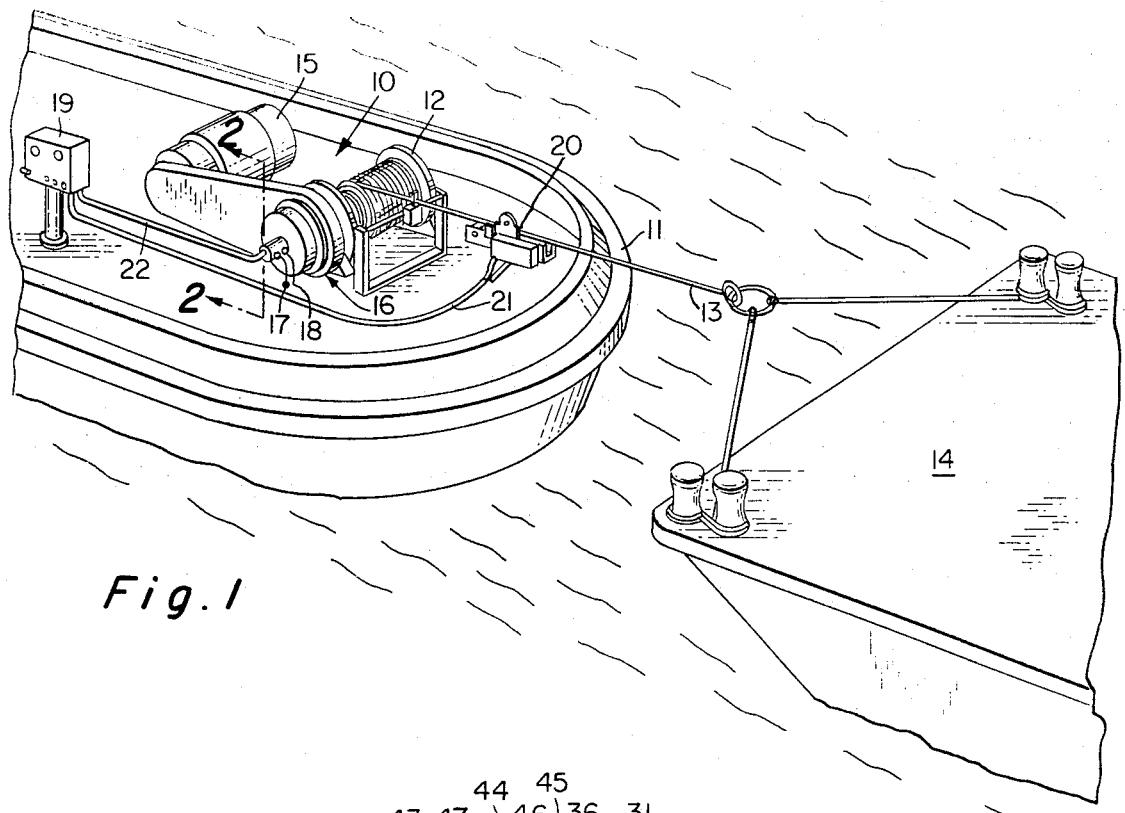
FIG. 1 is a perspective view of a coupled towing vessel and barge incorporating a towing winch in accordance with the present invention.

An understanding of the structure of the present invention towing winch can be best gained by reference to FIG. 1 wherein a towing winch in accordance with the present invention is shown, the present invention towing winch being generally designated by the reference numeral 10. Towing winch 10 is mounted upon a floating support structure typically being towing vessel 11. Towing winch 10 comprises drum 12 upon which is secured towing cable 13. The second end of towing cable 13 is secured to towed object 14, towed object 14 typically being a barge or other floating structure adapted to be towed.

The power source for towing winch 10 is provided by a unidirectional, multispeed motor 15 which is typically a conventional power source for producing rotational power upon a shaft. At each setting, motor 15 operates at a constant speed. The output of motor 15 is coupled to the housing of clutch 16, the hub of clutch 16 being secured to a drum shaft upon which is firmly secured drum 12. Although clutch 16 could be implemented through the use of a variety of clutches, clutch 16 is preferably an air actuated disc clutch capable of operating in a mode whereby a predetermined differential speed can be maintained between the driving element of the clutch coupled to the housing thereof, and the driven element thereof coupled to the drum shaft. The cooperating structure of motor 15, clutch 16, drum 12 and the incorporated drum shaft is similar to that described in Applicant's U.S. Letters Pat. No. 3,373,972. The operation of clutch 16 will be explained in detail hereinbelow. Clutch 16 is preferably a water cooled clutch, water inlet 17 and outlet 18 being shown in FIG. 1. Actuation of clutch 16 is provided by regulator 19 which provides means for regulating the air actuation of clutch 16. The details of regulator 19 will be explained in detail below.

As stated, an object of the present invention is to provide an improved towing winch for maintaining controlled tension in towing cable 13 as well as providing for maintenance of a predetermined interval between towing vessel 11 and towed object 14. As seen in FIG. 1, tension measuring apparatus 20 is mounted upon and slidably secured to towing cable 13, tension measuring apparatus 20 being responsive to the tension in cable 13 and producing proper hydraulic or pneumatic indicia of same to regulator 19 via hydraulic or pneumatic lines 21. Regulator 19 provides actuation of clutch 16 via air line 22 which properly controls the output torque of clutch 16 in a manner adapted to control the tension in towing cable 13 as well as enabling the maintenance of the proper interval between towing vessel 11 and towed object 14. Although it is within the scope of the invention to utilize a conventional tension measuring device, tension measuring apparatus 20 is preferably a load cell or tensiometer using a deflection type force frame and hydraulic load cell.

Figure 2:
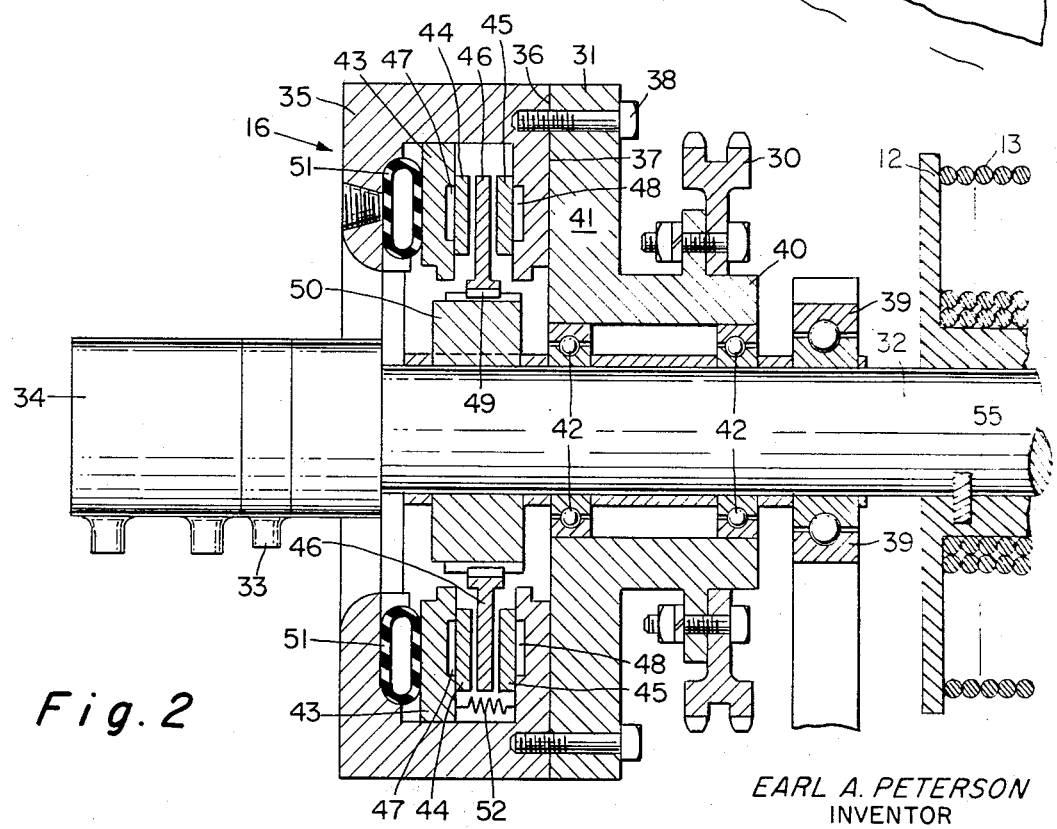
FIG. 2 is a side elevation, partial cross-sectional view of the clutch of FIG. 1 taken through line 2—2 of FIG. 1.

The ability of clutch 16 to control the tension in towing cable 13 and maintain a predetermined interval between towing vessel 11 and towed object 14 can be best understood by reference to FIG. 2 wherein a partial cross-sectional view of a clutch capable of operating in accordance with the present invention is shown. Clutch 16 is one capable of operating in a continuously slipping mode whereby a controllable differential speed can be maintained between the driving and driven elements of clutch 16. Sprockets 30 are connected to and impart rotational power to drive ring 31 which is secured to the housing of clutch 16. Sprockets 30 could be replaced by the power transmission apparatus such as a pulley and belt drive. Sprocket 30 and drive ring 31 are rotatably mounted upon drum shaft 32. Durm 12 is mounted upon and keyed at key 55 to drum shaft 32. The assembly created by mounting and keying drum 12 upon drum shaft 32 is known in the art as a dead shaft drum assembly. This is to be distinguished from a live shaft drum assembly in which the drum is journeled upon the shaft. In the present invention, housing 35 is rotated by the power source, torque being transmitted through friction elements 44 and 45 to driven friction disc 46 which is securely coupled to drum shaft 32. Since drum 12 is keyed to drum shaft 32, the torque imposed upon driven friction element 46 is directly transmitted to drum 12 since drum 12 is keyed to drum shaft 32 whereby they rotate as an integral unit. In a dead shaft drum assembly, the high inertia portion of the clutch assembly is used to drive the shaft 32. In a live shaft drum assembly, the low inertia portion of the clutch must drive through the high inertia member thereby providing for less efficient operation than that provided in a dead shaft drum assembly. Although it is within the scope of the present invention to implement clutch 16 by a number of conventional, mechanical engaging clutches, clutch 16 is preferably an air actuated, water cooled disc clutch capable of operating in a continuously slipping mode wherein a controlled differential speed can be maintained between the hub and housing of clutch 16 and therefore the engaged driven friction disc and driving friction elements of clutch 16. In this form of the present invention, air actuation and cooling of clutch 16 is accomplished through the use of roto-couplings 33 and 34 respectively.

As stated, it is within the scope of the present invention to implement continuously slipping clutch 16 through the use of torque transmitting clutches having heat dissipation characteristics suitable to permit significant speed differentials between the engaged input and output friction elements of the clutch. It is preferred that an air actuated, liquid cooled disc clutch be used to implement clutch 16. Referring now to FIG. 2, clutch 16 comprises a substantially cylindrical like housing 35, axial surface 36 thereof being secured to longitudinal surface 37 of drive ring 31, housing 35 being secured to drive ring 31 by conventional bolts 38. Drum shaft 32 is rotatably mounted in suitable bearings 39 of the mounting frame. Drive ring 31 is comprised of hub 40, and end thereof being radially extended into ring portion 41, ring portion 41 being secured to clutch housing 35. Drive ring 31 is rotatably mounted upon shaft 32, drive ring 31 being journeled on suitable bearings 42. Sprockets 30 are typical power receiving means and are radially secured to a portion of hub 40 of drive ring 31, sprockets 30 as shown in FIG. 2 having two sets of sprocket teeth for receiving the driving means from motor 15. Sprocket 30 can be mounted upon hub 40 by any suitable means.

Slidingly adjacent the inner axial surface of housing 35 is friction plate carrier 43, friction plate carrier 43 being adapted to receive driving friction element 44. Friction element 45 is secured to an interior receiving surface of housing 35 adjacent the surface of friction disc 46 and opposte friction element 44. Annularly disposed within driving friction plate carrier 43 and adjacent driving friction element 44 is annular channel 47. Annularly disposed within housing 35 adjacent friction element 45 is annular channel 48. Annular channels 47 and 48 are adapted to receive sufficient liquid, typically water, for dissipating heat created by the frictional engagement of friction elements 44 and 45 and friction disc 46. Friction disc 46 is typically mounted by spline teeth 49 on clutch hub 50 which in turn is keyed or otherwise secured to drive shaft 12. Friction disc 46 is axially movable along spline teeth 49 while being rotationally stationary with respect to hub 50.

In order to engage clutch 16, air is introduced to expandable element 51 by appropriate fittings through drum shaft 32 from roto-coupling 33 (not shown). Friction plate carrier 43 is slidably engaged to the interior wall of housing 35 to axially move along the axis of drum shaft 32 through the alternative action of expandable element 51 and return spring 52. Friction plate carrier 43 has no rotational motion with respect to housing 35 while permitting axial movement with respect thereto. Air is introduced for expanding expandable element 51 at air coupling 33 and liquid coolant is introduced at roto-coupling 34 to provide an inlet 17 and outlet 18 for the coolant disposed within annular channels 47 and 48, connections to conventional roto-coupling 34 not being shown.

In order for clutch 16 to operate as a continuously slipping clutch, clutch 16 must be fully capable of fully dissipating the heat horsepower generated by the frictional engagement between driving friction elements 44 and 45 and friction disc 46. When the present invention towing winch maintains a controlled tension in towing cable 13 and a proper interval between towing vessel 11 and towed object 14, clutch 16 will be engaged. Drive power is supplied by rotating sprockets 30 which in turn causes a given rotational speed and torque to be applied to housing 35 and friction plate carrier 43. The degree of tension in towing cable 13 is dependent upon the magnitude of the frictional engagement between driving friction elements 44 and 45 and driven friction disc 46. Air is introduced into expandable element 51 which in turn will cause friction plate carrier 43 to be slidably moved. Since friction element 45 is substantially stationary, driven friction disc 46 will be frictionally engaged between the opposing surfaces of friction elements 44 and 45. By providing a controlled speed differential between driving friction elements 44 and 45 and friction disc 46, the torque imposed upon drum shaft 32 will be imparted to drum 12 thereby maintaining a controlled tension in towing cable 13. Changes in the cable tension will permit control over the interval between towing vessel 11 and towed object 14. As stated, one of the objects of the present invention is to provide apparatus for maintaining controlled tension in towing cable 13. The requirement for maintaining controlled tension in towing cable 13 arises out of the environmental conditions within which the present invention is operated. As an example, when towing vessel 11 is entering or leaving maneuverable waters, the towing requirements will change substantially. In addition, where towing vessel 11 is to perform the towing operations on the high seas, it will encounter both vertical as well as lateral differential excursion velocities between towing vessel 11 and towed object 14. The improved present invention towing winch maintains controlled tension in towing cable 13 to counter the surge and shock loading on the tow lines thereby eliminating damage and wear to towing cable 13.

Figure 3:
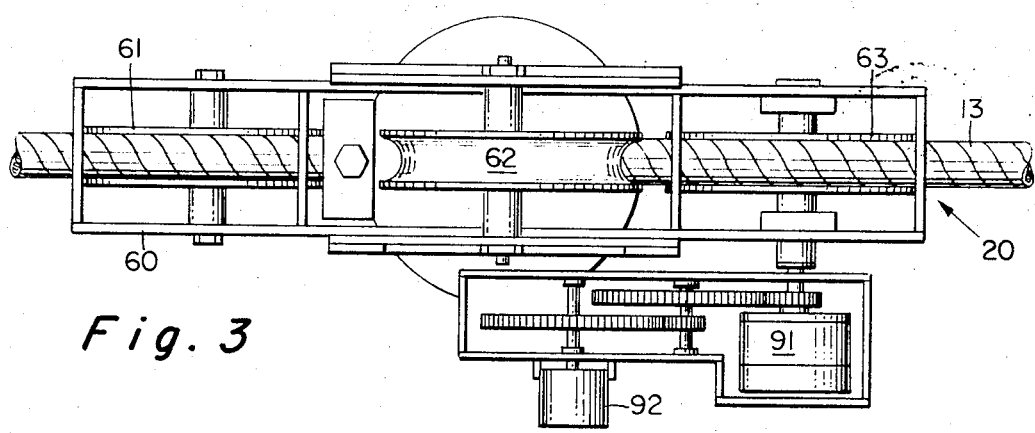
FIG. 3 is an enlarged, top view of the tension measuring apparatus of FIG. 1.
Figure 4:
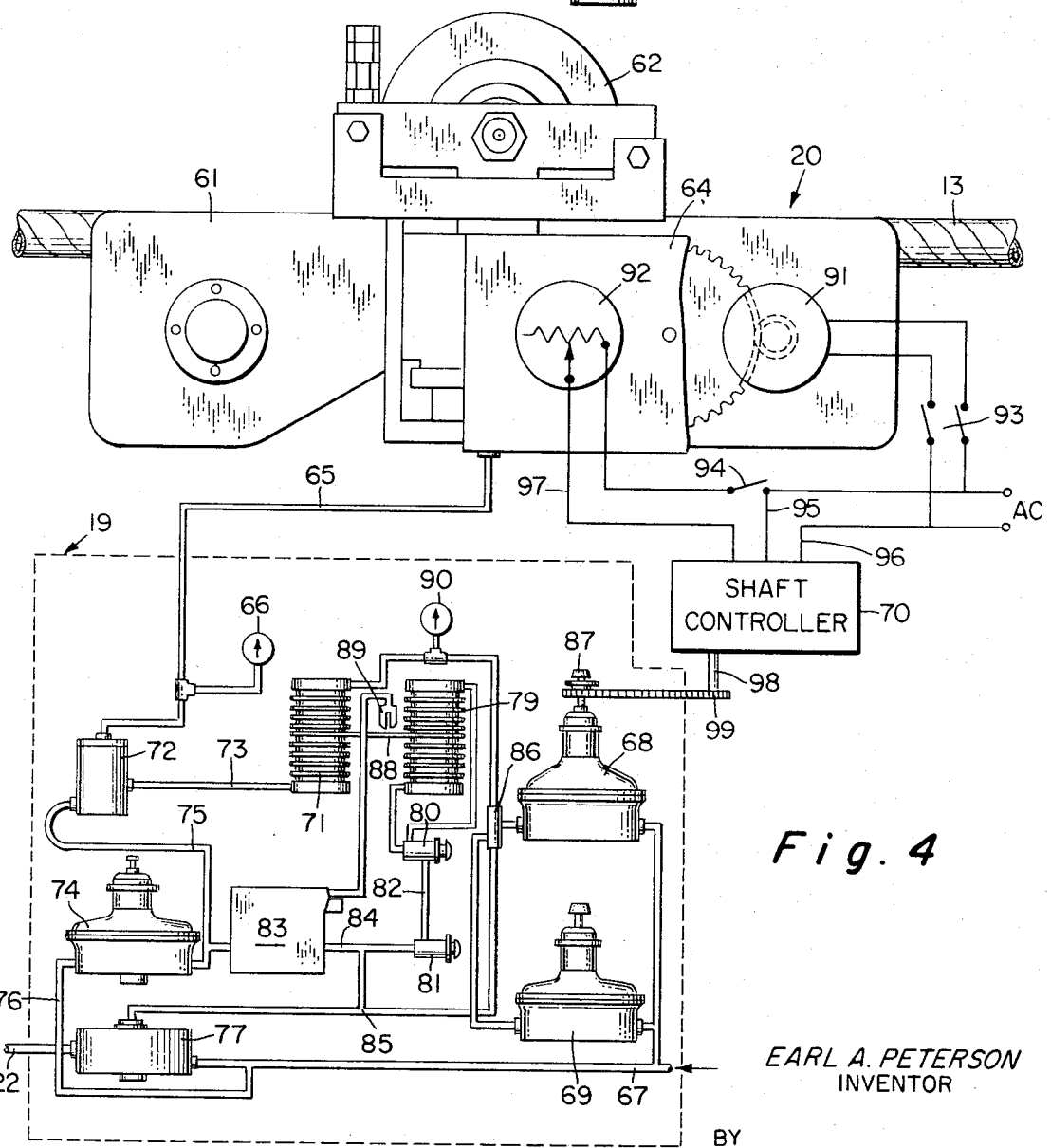
FIG. 4 is a schematic view of the clutch actuation controller in accordance with the present invention.

Referring now to FIG. 3 and FIG. 4, an example of a typical measuring apparatus is shown therein. Tension measuring apparatus 20 is a device adapted to measure and monitor tension in moving towing cable 13 during the operation of the present invention towing winch. Tension measuring apparatus 20 comprises a deflection force frame 60 incorporating three sheaves, 61, 62 and 63 longitudinally aligned and in rolling contact with towing cable 13. Towing cable 13 is deflected as it passes over sheaves 61 and 63 and under sheave 62, the deflection resulting in the imposition of force upon hydraulic load cell 64. As can be seen in FIG. 4, the downward deflection of towing cable 13 by sheave 62 will result in a signal responsive to the tension in towing cable 13. Although it is within the scope of the present invention to utilize any number of conventional tension measuring apparatus, the preferred embodiment of the present invention utilizes that shown in FIG. 3 and FIG. 4.

As stated, tension measuring apparatus 20 produces a hydraulic signal responsive to the tension in towing cable 13, the hydraulic signals being used to alter the output torque of clutch 13 to maintain the tension in towing cable 13 at a predetermined level. An understanding of regulating apparatus 19 used to maintain controlled tension in towing cable 13 can be best seen by reference to FIG. 4 wherein a schematic diagram of the regulating system and the controlled tension measuring apparatus 20 can be best seen. Tension measuring apparatus 20 is coupled to towing cable 13, load cell 64 being a conventional device adapted for sensing and measuring the tension in cable 13. Load cell 64 is responsive to the tension in towing cable 13, changing the hydraulic pressure in pressure line 65 in proportion to the tension in towing cable 13. Gauge 66 is coupled to pressure line 65 to visually illustrate the tension in towing cable 13.

As stated, the output of load cell 64 is coupled to regulator 19 by pressure line 65. One of the advantages of the present invention is to provide simplified control over operation of the present invention towing winch 10. Air under pressure is input at pressure line 67 from a conventional pressure source. The source of pressurized air to pressure line 67 is conventional and not shown. Pressure line 67 conducts the pressurized air to the variable air pressure load control valves 68 and 69. The variable air pressure valve 68 is actuated manually or by shaft controller 70 as shown, the output of valves 68 and 69 being connected to the conventional selector valve 86. Shaft controller 70 shall be discussed in detail hereinbelow.

Regulator 19 includes bellows chamber 71 which is coupled to hydraulic or pneumatic transducer 72 by pressure line 73. Although it was stated that load cell 64 produces a hydraulic or pneumatic pressure output, it is obvious that load cell 64 could be fabricated with any sensing device which is compatable with selected transducer 72. The output of transducer 72 is coupled to regulator valve 74 through pressure line 75. Air is introduced to regulator valve 74 from pressure line 67 via pressure line 76. A conventional booster relay 77 is serially coupled in pressure line 67 and therefore to the air line of roto-coupling 33 via pressure line 22. Bellows chamber 79 receives pressurized air from reset rate adjustment valve 80, valve 80 receiving pressurized air from proportional valve 81 via pressure line 82. Proportional valve 81 is coupled to relay valve 83 by pressure line 84. Pressurized air is supplied to relay valve 83 and proportional valve 81 through pressure line 85 which extends from selector valve 86. As a result of the above-defined coupling, the elements of regulator 19 are pressurized and controllable from air pressure control valve 68 which can be initially placed at a set point established by manual control 87.

In operation, when the output of load cell 64 increases the pressure in pressure line 65, this in turn will increase the pressure in bellows chamber 71 via the output of transducer 72 and coupling pressure line 73. The increase in pressure in bellows chamber 71 will move plate 88 upwardly toward nozzle 89 to simultaneously increase the pressure at booster relay 77 and proportional valve 81 and therefore at the input to bellows chamber 79. The increase in pressure at bellows chamber 79 will halt the increase in pressure to booster relay 77. The pressure in the pressure line leading to bellows chamber 79 will slowly pass through reset rate adjustment valve 80 and will increase the pressure in the lower part of bellows chamber 79. This will cause plate 88 to move towards nozzle 89, again increasing the pressure throughout the system and to booster relay 77 and the upper part of bellows chamber 79. This build up in pressure will increase pressure through the reset rate adjustment valve 80 to the lower part of bellows chamber 79 and start another increase throughout the system and to booster relay 77. The increase in pressure in the system will continue until the pressure from load cell 64 and transducer 72 is decreased and the system is brought back to its predetermined set point as established at control valve 68.

As stated, the hydraulic output of load cell 64 is received by transducer 72. Transducer 72 converts the hydraulic signal from load cell 64 to a functional air pressure level which is transmitted to and used by regulator 19 to establish the appropriate output torque of clutch 16. Regulator 19 compares the air pressure signal output by transducer 72 with the set point to establish the desired tension to be maintained in towing cable 13. If the two are not equal, the air actuating pressure to clutch 16 is increased or decreased causing a change in output torque in a polarity to maintain equality between the air pressure signal from transducer 72 and the set point established by manual control 87 of air pressure control valve 68. In this manner, the set point established at control valve 68 and visually observable at gauge 90 becomes the sum of the total forces being exerted on towing cable 13. A change in the load or force on towing cable 13 will typically alter the tension in towing cable 13 and will be compensated for by a change in the output torque of clutch 16, the change being opposite in direction to the change in tension in towing cable 13. The tension to be maintained in towing cable 13 can be increased or decreased by changing the set point at control 87 of air pressure control valve 68. It is by changing the tension in towing cable 13 that the relative interval between towing vessel 11 and towed object 14 can be maintained. The manner in which the present invention towing winch 10 maintains the predetermined interval will be discussed in detail below.

As stated, the tension in towing cable 13 is maintained at a predetermined level through the operation of regulator 19, tension measuring apparatus 20 and air actuation of clutch 16. In order to maintain a predetermined interval between towing vessel 11 and towed objects 14, measurement of the linear displacement of towing cable 13 is used. Referring again to FIG. 3 and FIG. 4, sheave 63 is rotatably in contact with towing cable 13 and is coupled to clutch 91 for transmitting the linear displacement of towing cable 13 and therefore sheave 63 to means for outputting a signal responsive to the linear displacement. Clutch 91 is typically a conventional electric clutch and will transmit displacement indicia and therefore the rotational movement of sheave 63 to potentiometer 91. Potentiometer 92 is a spring centered potentiometer which, when connected to the source of alternating current power, will output an alternating current signal responsive to the change in position of towing cable 13, the change being with respect to an initial configuration of towing vessel 11 and towed object 14. As shown in FIG. 3, a conventional gear train is used to mechanically transmit the rotational output of sheave 63 to the wiper contact of potentiometer 92. When potentiometer 92 is connected to a source of alternating current, an electrical signal proportional to the linear movement of towing cable 13 will be readable at the wiper contact of potentiometer 92.

An understanding of the manner in which the tension in towing cable 13 can be changed can be best seen by reference to FIG. 4 wherein a schematic diagram of the interconnections between potentiometer 92, shaft controller 70 and air pressure control valve 68 are shown. Clutch 91 is connected to a source of alternating current power by switch 93. When clutch 91 is engaged and switch 94 closed, the wiper contact of potentiometer 92 will output a signal responsive to the linear movement of towing cable 13. Shaft controller receives AC power at lines 95 and 96 and a connection from the wiper of potentiometer 92 at line 97. The output of shaft controller 70 is mechanical shaft 98 rotatable in a bidirectional manner. Shaft 98 is coupled to control 87 of control valve 68 by chain drive 99 or other appropriate coupling means. As will be described, a change in the position of potentiometer 92 will produce a disturbance of the null condition of the shaft controller 70 thereby changing the position of shaft 98 in response thereto. The rotation of shaft 98 will change the set point at control valve 68 thereby changing the tension in towing cable 13 to counter or change the linear movement of towing cable 13. The relative interval between vessel 11 and towed object 14 can be established at any position, any change from that null position being countered by shaft controller 70.

Figure 5:
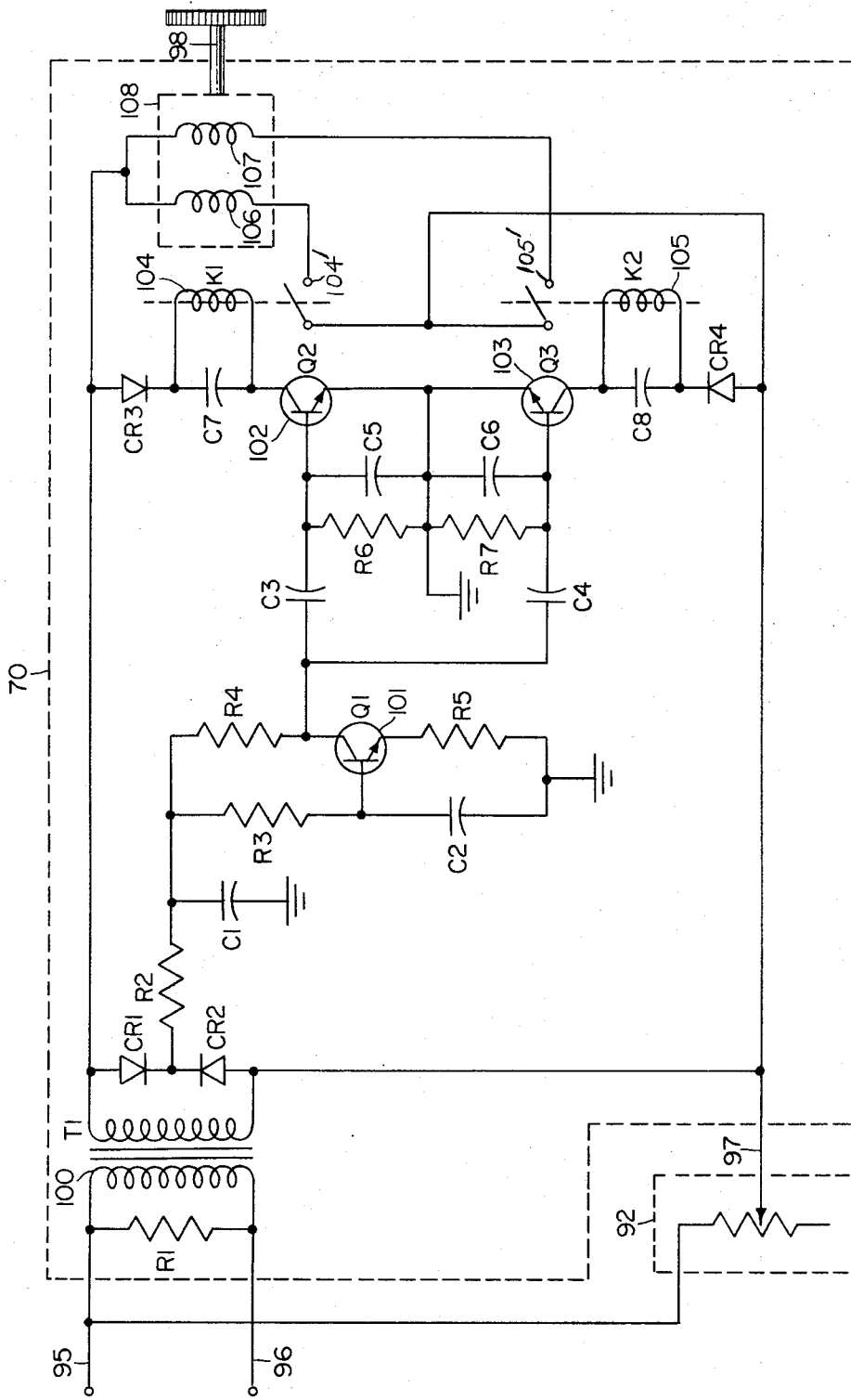
FIG. 5 is a circuit diagram of the shaft controller of FIG. 4.

Referring now to FIG. 5, a schematic of a suitable electrical circuit for implementation of shaft controller 70 is shown therein, the circuit controlling shaft 98 and thereby producing means for changing the tension in towing cable 13 to compensate for linear displacement thereof. The circuit shown in FIG. 5 is merely a suitable circuit for implementation of shaft controller 70, it being obvious to one having skill in the art that other suitable circuits could be used in place thereof. AC lines 95 and 96 transmit AC power to transformer 100 for stepping down the input power to a usable AC level. The output of transformer 100 is rectified and applied to transistor 101 to provide a reference level for matched transistors 102 and 103. Transistors 102 and 103 are biased at a null level to provide equivalent reciprocal operation of electro-magnetic relays 104 and 105. Each relay 104 and 105 has a single set of normally open contacts 104' and 105' respectively, which provide balanced signals at rotor coils 106 and 107 of a conventional electro-magnetic rotor 108 during null state. Rotor 108 is coupled to shaft 98 to provide the bidirectional movement of control 87 of air pressure control valve 68. In the preferred embodiment of the present invention, the transient signal arising out of the linear displacement of towing cable 13 is transmitted to shaft controller 70 by the output of the wiper of potentiometer 92. By changing the position of the potentiometer 92, the null state of shaft controller 70 is interrupted, the polarity of the signal being transmitted to rotor coils 106 and 107 being biased to counter the linear positional change of towing cable 13 and therefore the change position of potentiometer 92. The change in position of shaft 98 as a result of the movement of rotor 108 will bring potentiometer 92 back to the null position thereby recreating the quiescent condition and establish the predetermined interval between towing vessel 11 and towed object 14.

As stated, the present invention towing winch 10 is typically utilized upon towing vessel 11 which initiates operation by picking up a towed object 14, such as a barge at a dock or mooring. Towing vessel 11 moves to the bow of barge 14 attaching towing cable 13 to barge 14 and hauling in towing cable 13 until the bow of barge 14 is brought into juxtapostion with the stern of towing vessel 11 establishing a predetermined tension in towing cable 13. When towing vessel 11 moves away from the dock or mooring with barge 14 under control, it may then move into maneuverable waters. At this time, the tension in towing cable 13 is reduced to allow towing cable 13 to be payed out as towing vessel 11 moves away from barge 13. This will typically be accomplished by manually operating control 87 of air pressure control valve 68 (FIG. 4). When the predetermined interval between towing vessel 11 and barge 14 is achieved, the operator will alter the set point of regulator 19 until barge 14 and towing vessel 11 are both moving at the same time maintaining the predetermined interval therebetween. After the predetermined interval has been established, switches 93 and 94 are moved to the on position thereby engaging clutch 91 which will transmit any linear displacement of towing cable 13 to potentiometer 92. With clutch 91 engaged, the present invention towing winch 10 will maintain both the predetermined interval between towing vessel 11 and barge 14, anc control the tension in towing cable 13.

The present invention towing winch provides improved apparatus for carrying out towing operations in an aqueous environment. The present invention eliminates many of the complicated and costly mechanical elements required by devices disclosed in the prior art. The objects of the present invention can be carried out through the use of a clutch capable of maintaining differential speeds between the driving and driven elements thereof while the clutch is engaged in combination with tension and linear displacement measuring apparatus. The improved towing winch provides substantial economy and ease in operation and solves problems in a more efficient manner than prior devices.

I claim:

1. A towing winch for use with a towing vessel and towed member comprising:
   a. a winch mounted upon the towing vessel including a drum shaft, a drum concentrically disposed about and keyed to said drum shaft whereby said drum and drum shaft rotate as an integral unit, a drum cable disposed about said drum an end thereof secured to the towed member, a unidirectional rotating power source, a continuously slipping clutch interposed between and coupled to said rotating power source and said drum shaft whereby the rotation of said rotating power source is transmitted to said drum shaft;
   b. a tension measuring member coupled to said towing cable and outputting a signal responsive to the tension in said towing cable;
   c. air pressure regulating means for regulating the transmission of power from said unidirectional rotating power source through said continuously slipping clutch, said air pressure regulating means coupled to said continuously slipping clutch;
   d. means coupling the output signal of said tension measuring member to said air pressure regulating means; and
   e. linear displacement measurement means for measuring the linear displacement of said towing cable coupled to said air pressure regulating means and said tension measurement member whereby the power transmitted through said continuously slipping clutch is changed in response to the linear displacement of said towing cable.

2. A towing winch as defined in claim 1 wherein said continuously slipping clutch comprises an inner hub and outer housing adapted to frictionally rotate with respect to each other and liquid means for dissipating the frictionally generated heat therein, said drum shaft being secured to said inner hub and said power source being coupled to said outer housing.

3. A towing winch as defined in claim 2 wherein said continuously slipping clutch further includes a friction disc secured to said inner hub, friction elements adapted to slidably engage and rotate with said outer housing, said liquid means for dissipating heat adjacent to the friction elements, and air actuated expandable elements secured to said housing and adjacent said firction elements whereby said friction elements frictionally engage said friction disc upon actuating said expandable elements.

4. A towing winch as defined in claim 3 wherein said air pressure regulating means is coupled to said air actuated expandable elements, said frictional engagement being responsive to the regulated air pressure.

5. A towing winch as defined in claim 1 wherein said linear displacement measurement means includes rotating means for converting the linear displacement of said towing cable to angular movement, a displacement clutch coupled to said rotating means, a potentiometer having a mechanically movable wiper coupled to said displacement clutch whereby the mechanical position of said wiper is responsive to the linear movement of said towing cable.

6. A towing winch as defined as claim 5 further including means coupling the position of the wiper of said potentiometer to said air pressure regulating means.

7. A towing winch for use with a towing vessel and towed member comprising:
   a. a winch mounted upon the towing vessel including a drum shaft, a drum concentrically disposed about and keyed to said drum shaft whereby said drum and drum shaft rotate as an integral unit, a drum cable disposed about said drum an end thereof secured to said towed member, a unidirectional rotating power source, a continuously slipping clutch comprising an inner hub and outer housing adapted to frictionally rotate with respect to each other and liquid means for dissipating the frictionally generated heat therein, said drum shaft being secured to said inner hub and said outer housing being coupled to said power source;
   b. a tension measuring member coupled to said towing cable and outputting a signal responsive to the tension in said towing cable and including a sheave in contact with said towing cable whereby the linear displacement of said towing cable is converted to the rotation of said sheave;
   c. air pressure regulating means for regulating the transmission of power from said unidirectional rotating power source through said continuously slipping clutch;
   d. means coupling the output of said tension measuring member to said air pressure regulating means; and
   e. a linear displacement measurement member including a displacement clutch having a first and second member, the first member thereof being coupled to said sheave, a potentiometer having a moveable wiper, said wiper being coupled to the second member of said displacement clutch whereby the position of said wiper is responsive to the linear movement of said towing cable and electrically coupled to said air pressure regulating means.

8. A towing winch as defined in claim 7 wherein said unidirectional rotating power source rotates at a constant speed.

9. A towing winch as defined in claim 7 wherein said continuously slipping clutch further includes a friction disc secured to said inner hub, friction elements adapted to slidably engage and rotate with said outer housing, said liquid means for dissipating heat adjacent to the friction elements, and air actuated expandable elements secured to said housing and adjacent said firction elements whereby said friction elements frictionally engage said friction disc upon actuating said expandable elements.

10. A towing winch as defined in claim 9 wherein said air pressure regulating means is coupled to said air actuated expandable elements, the frictional engagement of said continuously slipping clutch being responsive to the regulated air pressure.

11. A towing winch for use with a towing vessel and towed member comprising:
   a. a winch mounted upon the towing vessel and including a drum shaft, a drum concentrically disposed about and keyed to said drum shaft whereby said drum and drum shaft rotate as an integral unit, a drum cable disposed about said drum an end thereof being secured to said towed member, a unidirectional rotating power source, a continuously slipping clutch comprising an inner hub and outer housing, a friction disc secured to said inner hub, friction elements to slidably engage and rotate within said outer housing, liquid means for dissipating heat being adjacent said friction elements, and air actuated expandable elements secured to said housing and adjacent said friction elements, said drum shaft being secured to said inner hub and said power source being coupled to said outer housing whereby said friction elements frictionally engage said friction disc upon actuating said expandable elements transmitting the power of said power source to said drum shaft;
   b. a tension measuring member coupled to said towing cable and adapted to output a hydraulic signal responsive to the tension in said towing cable, said tension measuring member incorporating at least one sheave in contact with said towing cable, said sheave adapted to convert the linear displacement of said towing cable to rotational displacement;
   c. an air pressure regulator including a transducer coupled to said tension measuring member and the output thereof being responsive to said hydraulic signal, generating means coupled to said transducer for generating air pressure signals in response to the output of said transducer and means for coupling said air generating means to said air actuated expandable elements whereby the engagement of said friction elements and said friction disc is regulated; and
   d. a linear displacement measurement member including a displacement clutch having a first and second member, the first member coupled to said sheave, a potentiometer having a mechanically moveable wiper, said wiper being mechanically coupled to the second member of said displacement clutch whereby the position of said wiper is responsive to the linear movement of said towing cable, and being electrically coupled to said air pressure regulator.

* * * * *